United States Patent
Tsai et al.

(10) Patent No.: US 8,195,662 B2
(45) Date of Patent: Jun. 5, 2012

(54) DENSITY-BASED DATA CLUSTERING METHOD

(75) Inventors: Cheng-Fa Tsai, Pingtung County (TW); Yi-Ching Huang, Chiayi County (TW)

(73) Assignee: National Pingtung University Of Science & Technology, Pingtung County (TW)

( * ) Notice: Subject to any disclaimer, the term of this patent is extended or adjusted under 35 U.S.C. 154(b) by 214 days.

(21) Appl. No.: 12/683,239

(22) Filed: Jan. 6, 2010

(65) Prior Publication Data

US 2011/0072016 A1    Mar. 24, 2011

(30) Foreign Application Priority Data

Sep. 23, 2009 (TW) .............................. 98132151 A

(51) Int. Cl.
*G06F 17/30* (2006.01)
(52) U.S. Cl. ........ 707/736; 707/737; 707/738; 707/739; 707/740
(58) Field of Classification Search ........... 707/736–737
See application file for complete search history.

(56) References Cited

U.S. PATENT DOCUMENTS

| | | | | |
|---|---|---|---|---|
| 6,148,295 | A * | 11/2000 | Megiddo et al. .................. | 1/1 |
| 6,263,334 | B1 * | 7/2001 | Fayyad et al. ................. | 707/737 |
| 6,714,679 | B1 * | 3/2004 | Scola et al. .................... | 382/199 |
| 2002/0107858 | A1 * | 8/2002 | Lundahl et al. ............... | 707/100 |
| 2002/0169772 | A1 * | 11/2002 | Aggarwal ......................... | 707/6 |
| 2003/0153823 | A1 * | 8/2003 | Geiser et al. .................. | 600/407 |
| 2004/0070585 | A1 * | 4/2004 | Papiernik et al. ............. | 345/420 |
| 2005/0286865 | A1 * | 12/2005 | Dorai et al. ..................... | 386/69 |
| 2007/0116342 | A1 * | 5/2007 | Zarkh et al. .................... | 382/130 |
| 2007/0250476 | A1 * | 10/2007 | Krasnik ............................ | 707/2 |
| 2009/0043220 | A1 * | 2/2009 | Montgomery et al. ....... | 600/544 |

* cited by examiner

*Primary Examiner* — Hanh Thai
(74) *Attorney, Agent, or Firm* — Muncy, Geissler, Olds & Lowe, PLLC

(57) ABSTRACT

A density-based data clustering method, comprising a parameter-setting step, a first retrieving step, a first determination step, a second determination step, a second retrieving step, a third determination step and first and second termination determination steps. The parameter-setting step sets parameters. The first retrieving step retrieves one data point and defines neighboring points. The first determination step determines whether the number of the data points exceeds the minimum threshold value. The second determination step arranges a plurality of first border symbols. The second retrieving step retrieves one seed data point from the seed list, arranges a plurality of second border symbols and defines seed neighboring points. The third determination step determines whether a data point density of searching ranges of the seed neighboring points is the same. The first termination determination step determines whether the clustering is finished. The second termination determination step determines whether to finish the method steps.

8 Claims, 9 Drawing Sheets

DENSITY-BASED DATA CLUSTERING METHOD

BACKGROUND OF THE INVENTION

1. Field of the Invention

The present invention relates to a density-based data clustering method and, more particularly, to a data clustering method that performs a data clustering operation dependent on the local data point density of a data set.

2. Description of the Related Art

Traditionally, the data clustering method is primarily based on the density of the data points. For example, based on a defined radius and a minimum threshold value of data point, if the density of data points of a certain area meets a required condition (that is, the number of the data points is higher than the minimum threshold value), an extension and searching operation is performed for each data point located in the area. Subsequently, the areas that meet the required condition will be determined and merged together to obtain a resulted data cluster. The known representative data clustering methods comprise DBSCAN and IDBSCAN, as illustrated below:

1. DBSCAN Data Clustering Method:

The first step of the method is selecting one out of a plurality of data points from a data set in a random manner, with the selected data point being regarded as an initial seed data point. The second step is determining whether the number of the data points within a circular range, that is radially extended from the current seed data point with a radius of R, exceeds the minimum threshold value. If so, the data points within the range are categorized as the same cluster and regarded as new seed data points. The third step is repeating the previous second step using the new seed data points until all data points of the data set are categorized. The traditional DBSCAN data clustering method performs the data clustering based on the density of data point, so it is capable of filtering the noise data points (the data points with low density) and suitable for the irregular-patterned data points.

2. IDBSCAN Data Clustering Method:

The method improves upon the DBSCAN data clustering method by reducing the number of times of the extension and searching operations performed for the numerous data points. The method simply creates 8 symbols on the border of a circular range that is radially extended from a seed data point with a radius of R, with the 8 symbols spacing from each other evenly. Based on this, the 8 data points closest to the 8 symbols within the circular range are determined and regarded as seed data points. Therefore, the number of the seed data points is greatly reduced, thus reducing the time consumption.

Although the above traditional data clustering methods are capable of filtering the noise data points and suitable for the irregular-patterned data points, however, the data point density within the resulted data cluster may not be even. The traditional data clustering methods are not able to further cluster the data points within the resulted data cluster based on the local data point density. To further cluster the data points within the resulted data cluster, a DD-DBSCAN data clustering method, which improves upon the previously-described data clustering methods, was later proposed, as described below.

3. DD-DBSCAN Data Clustering Method:

The method mainly improves upon the traditional DBSCAN method. The method defines three parameters: a scanning radius R, a minimum threshold value (for data points) and a tolerance index $\alpha$. The first step of the method is selecting one out of a plurality of data points from a data set in a random manner, with the selected data point regarded as an initial seed data point. The second step is determining whether the number of the data points within a circular range, that is radially extended from the current seed data point with a radius of R, exceeds the minimum threshold value. The third step of the method is selecting one data point other than the initial seed data point from the circular range as a reference data point and determining whether the number of the data points within a searching range of the reference data point is higher than the minimum threshold value. If so, all data points within the searching range of the reference data point are defined as secondary seed data points. In a fourth step of the method, it is determined whether the number of data points within a searching range of each secondary seed data point is higher than the minimum threshold value. If so, it is determined whether the data point density of the searching range of each secondary seed data point is same as that of the reference data point. If the data point density of the searching range of each secondary seed data point is same as that of the reference data point, all data points located in the searching ranges of the reference data point and the initial seed data point are clustered together as a data cluster and treated as seed data points. The fifth step of the method is repeating the previous third and fourth steps until all seed data points are finished. The sixth step of the method is repeating the previous first through fifth steps until all data points of the data set are clustered.

However, although the traditional DD-DBSCAN method is capable of performing data clustering operation according to the local data point density, it takes a considerable time for operation. Therefore, there is a need to improve the above data clustering methods.

SUMMARY OF THE INVENTION

An embodiment of the invention discloses a density-based data clustering method, comprising a parameter-setting step, a first retrieving step, a first determination step, a second determination step, a second retrieving step, a third determination step, a first termination determination step and a second termination determination step. The parameter-setting step sets parameters of a scanning radius, a minimum threshold value and a tolerance index. The first retrieving step retrieves one data point from a data set as an initial core point and defines all data points located in a searching range of the initial core point as neighboring points, wherein the searching range is extended from the initial core point with a radius of the scanning radius. The first determination step determines whether the number of the data points located in the searching range of the initial core point exceeds the minimum threshold value. The first determination step re-performs the first retrieving step when the determination of the first determination step is positive. The first determination step arranges a plurality of border clustering symbols on the border of the searching range of the initial core point and defines the neighboring points closest to the plurality of border clustering symbols as clustering neighboring points when the determination of the first determination step is negative. The second determination step determines according to the tolerance index whether a data point density of searching ranges of the clustering neighboring points is the same as a data point density of the searching range of the initial core point. The second determination step arranges a plurality of first border symbols on the border of the searching range of the initial core point, defines the neighboring points closest to the plurality of first border symbols as extension neighboring points, adds the extension neighboring points to a seed list as seed data points, and defines all data points located in searching ranges of the extension neighboring points and the initial core point as the same cluster when the determination of the second determination step is positive. The second determination step re-performs the first retrieving step when the determination of the second determination step is negative. The second retrieving step retrieves one seed data point from the seed list as a seed core point, arranges a plurality of second border symbols on the border of a searching range of the seed core point and defines the neighboring points closest to the plurality of second border symbols as seed neighboring points. The third determination step determines whether a data point density of searching ranges of the seed neighboring points is the same according to the tolerance index. The first termination determination step determines whether the clustering for a single data cluster is finished. The second termination determination step determines whether to finish the method steps according to a condition.

Further scope of the applicability of the present invention will become apparent from the detailed description given hereinafter. However, it should be understood that the detailed description and specific examples, while indicating preferable embodiments of the invention, are given by way of illustration only, since various will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
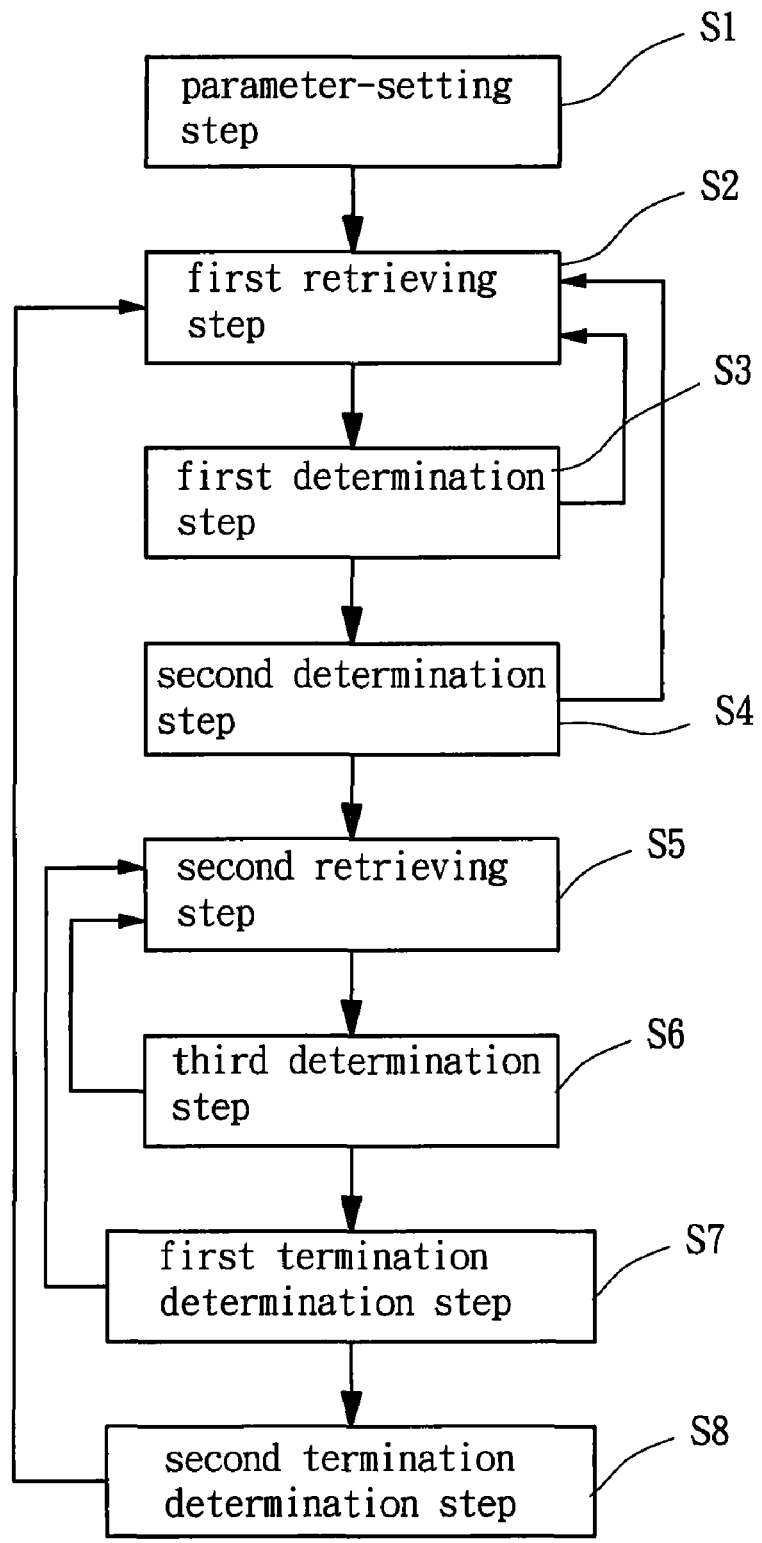
FIG. 1 is a flowchart illustrating a data clustering method according to a preferable embodiment of the invention.

In the various figures of the drawings, the same numerals designate the same or similar parts. Furthermore, when the term "first", "second", "inner", "outer" "top", "bottom" and similar terms are used hereinafter, it should be understood that these terms are reference only to the structure shown in the drawings as it would appear to a person viewing the drawings and are utilized only to facilitate describing the invention.

DETAILED DESCRIPTION OF THE INVENTION

Figure 2:
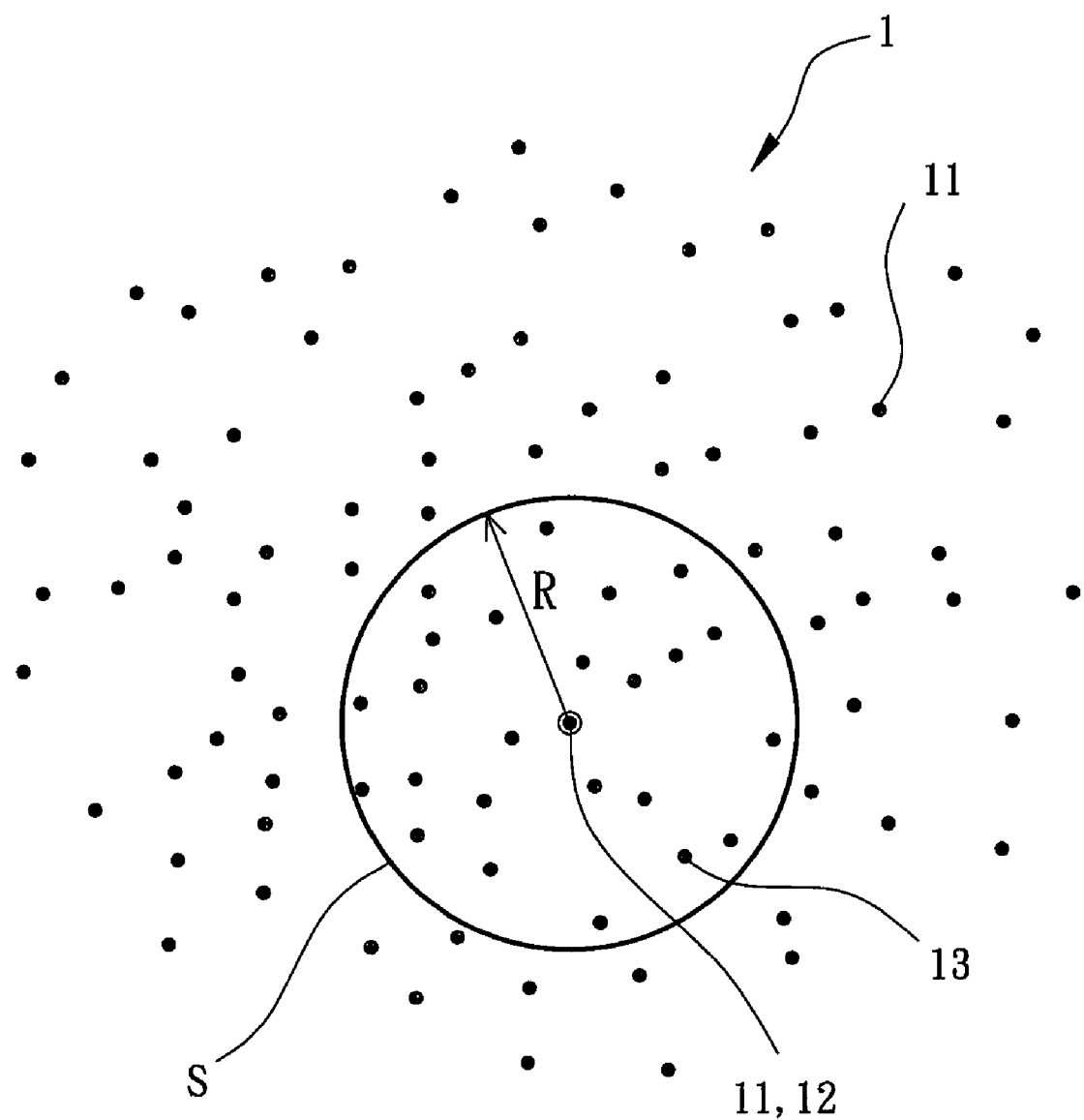
FIG. 2 is a flowchart illustrating a first retrieving step according to a preferable embodiment of the invention.

Referring to FIGS. 1 and 2, a preferred embodiment of a data clustering method proposed by the invention is executed under a structure where a computer system is connected to at least a database that stores a data set 1 comprising a plurality of data points. The data clustering method of the invention comprises a parameter-setting step S1, a first retrieving step S2, a first determination step S3, a second determination step S4, a second retrieving step S5, a third determination step S6, a first termination determination step S7 and a second termination determination step S8. With the above steps, the data points within a data set may be clustered based on the local data point density thereof.

Referring to FIGS. 1 and 2, the parameter-setting step S1 of the invention defines in the computer system a scanning radius R, a minimum threshold value and a tolerance index α. Specifically, the value of the scanning radius R is proportional to the minimum threshold value. The larger the value of the scanning radius R is, the larger the minimum threshold value is. By having the minimum threshold value set proportional to the value of scanning radius R, the accuracy of data clustering can be improved. In addition, the value of the tolerance index α is between 0 and 1. The invention herein defines a circular range that is radially extended from any data point 11 of the data set 1 with a radius of the scanning radius R as a "searching range S".

Referring to FIGS. 1 and 2, the first retrieving step S2 retrieves one data point 11 from the data set 1 as an initial core point 12. Herein, the invention defines all data points located in a searching range S of any one of the data points 11 of the data set 1 as neighboring points 13. In particular, the distance between the initial core point 12 and each data point 11 within the data set 1 is calculated. If the distance between a certain data point 11 and the initial core point 12 is smaller than the value of the defined scanning radius R, the data point 11 is regarded as a neighboring point.

Figure 3:
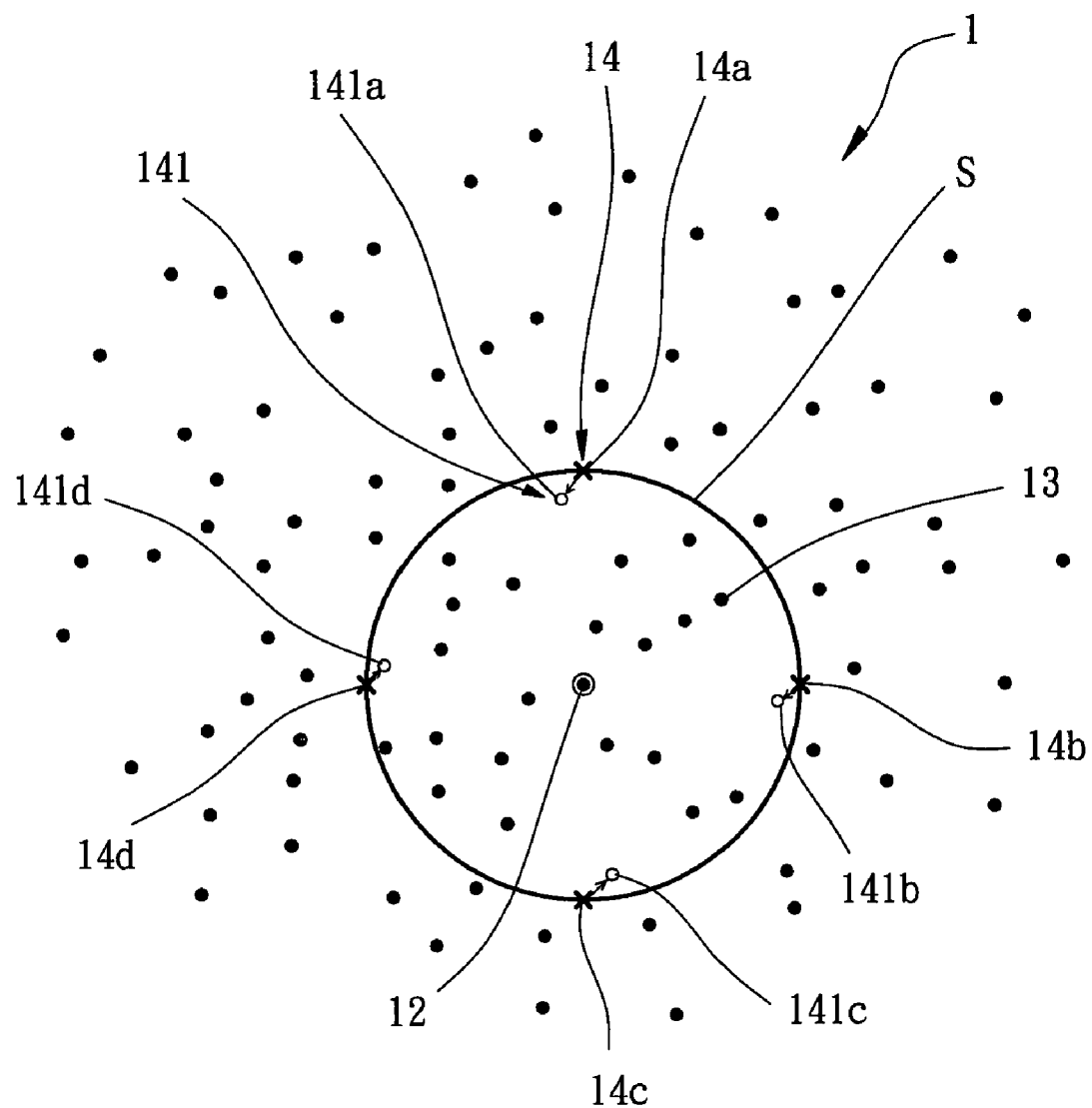
FIG. 3 is a flowchart illustrating a first determination step according to a preferable embodiment of the invention.
Figure 4:
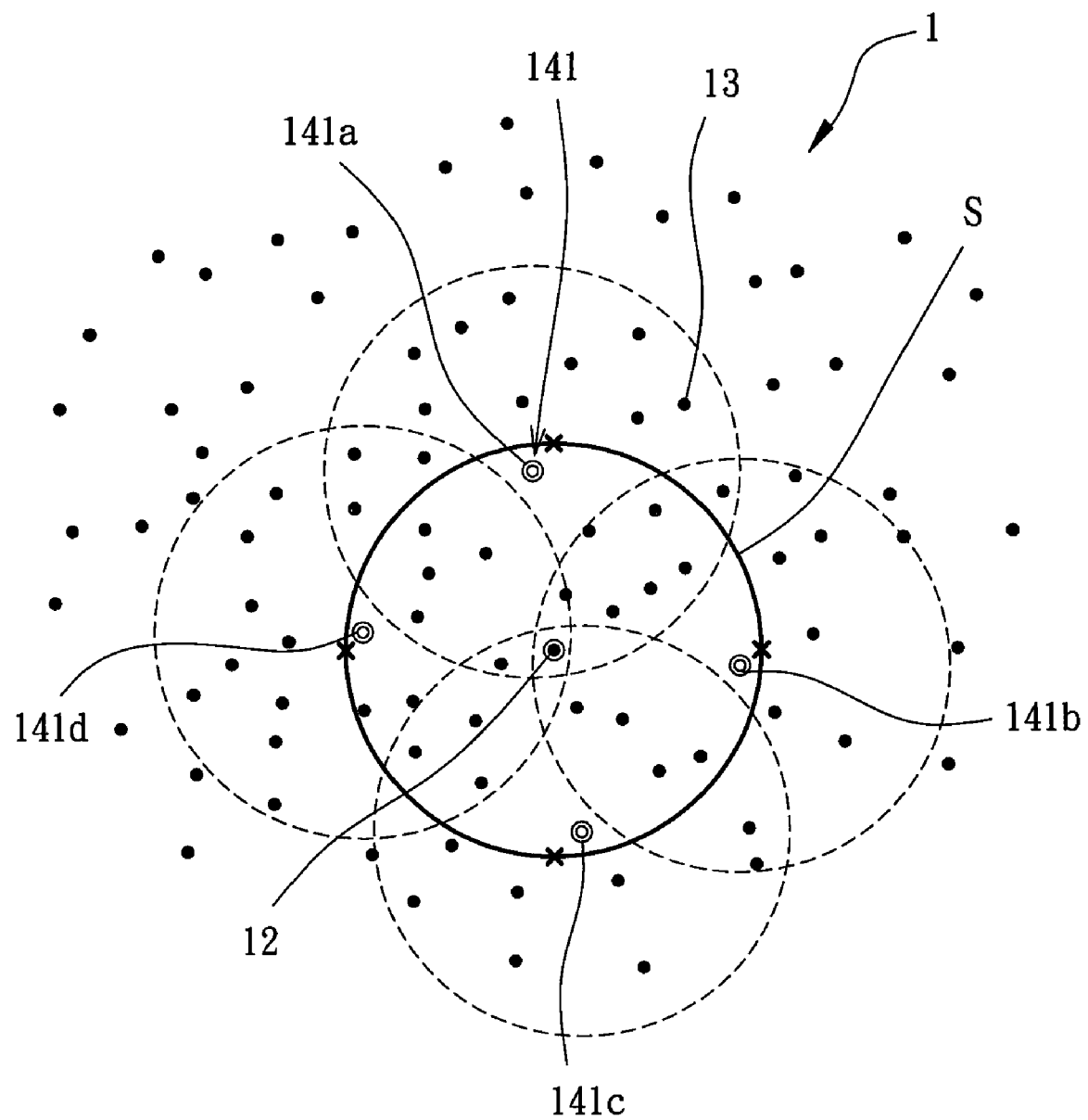
FIG. 4 is a flowchart illustrating a second determination step according to a preferable embodiment of the invention.
Figure 5:
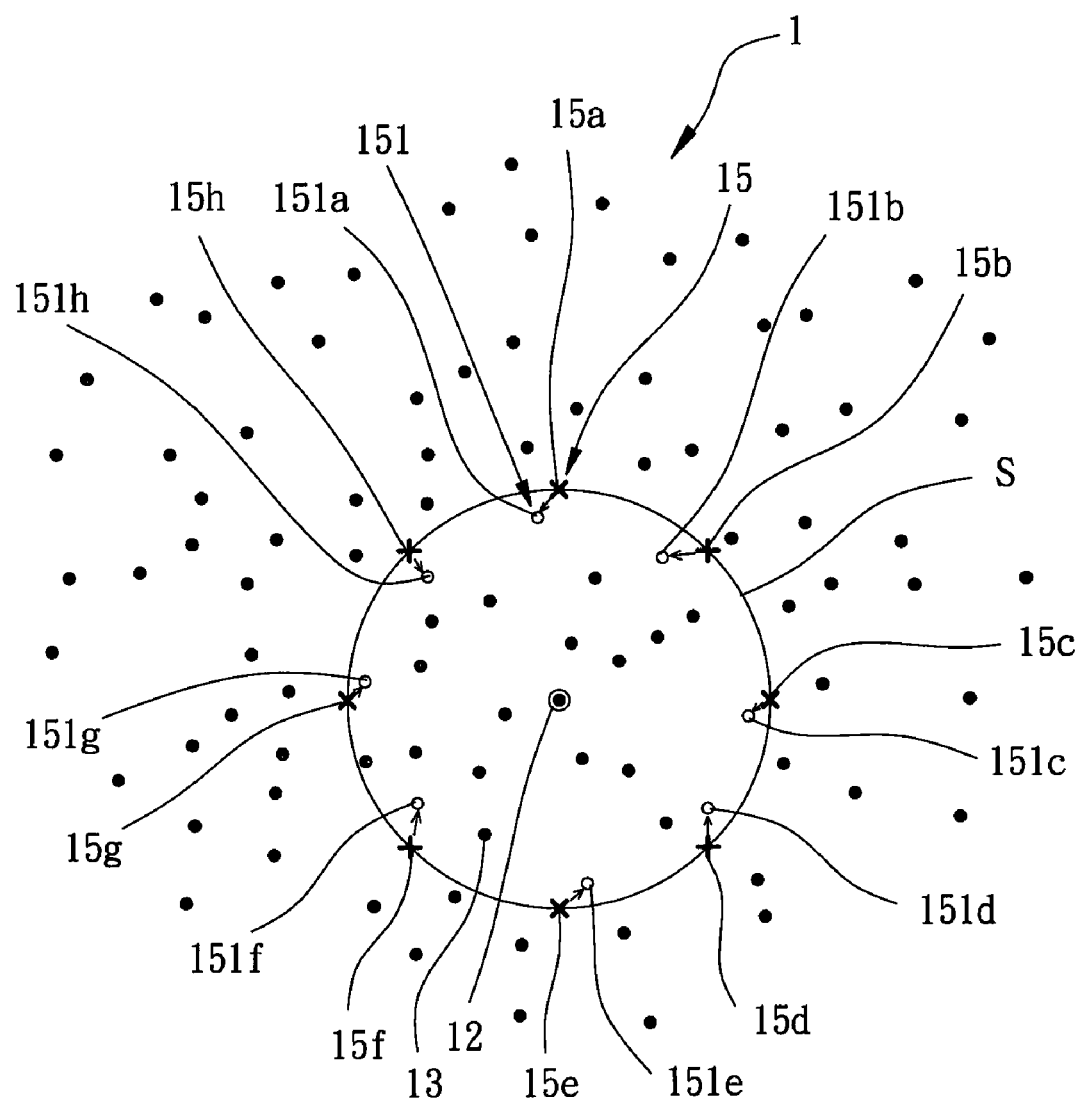
FIG. 5 is another flowchart illustrating a second determination step according to a preferable embodiment of the invention.
Figure 6:
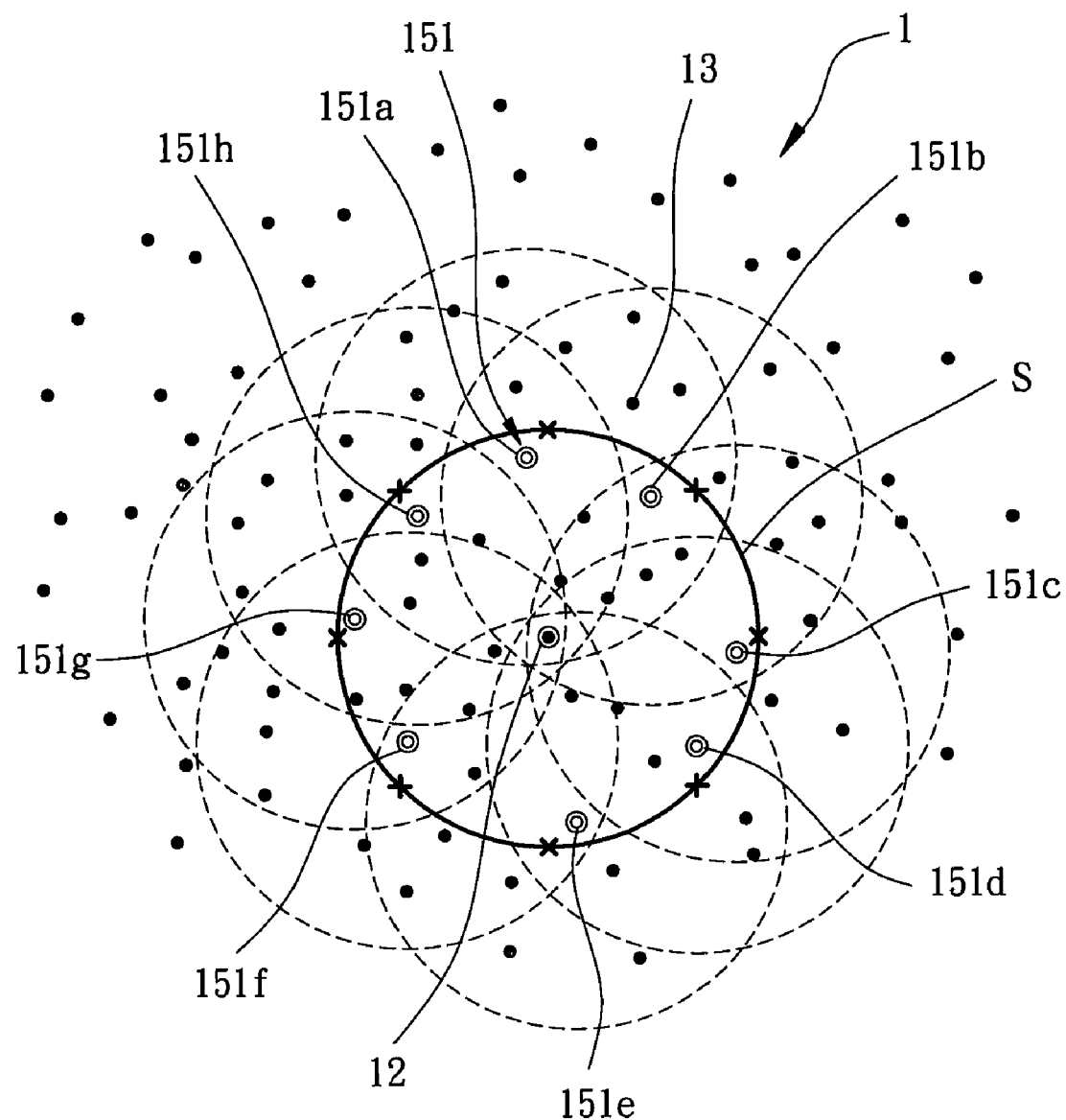
FIG. 6 is another flowchart illustrating a second determination step according to a preferable embodiment of the invention.

Referring to FIGS. 1 through 3, the first determination step S3 of the invention determines whether the number of the neighboring points 13 located in the searching range S of the initial core point 12 is smaller than the minimum threshold value. If so, the initial core point 12 and the neighboring points 13 are regarded as noise points, and the first retrieving step S2 is re-performed. If not, a plurality of border clustering symbols 14 is arranged on the border of the searching range S of the initial core point 12, and the neighboring points 13 closest to the plurality of border clustering symbols 14 are defined as clustering neighboring points 141. In particular, the invention evenly arranges 4 border clustering symbols 14a, 14b, 14c and 14d on the border of the searching range S of the initial core point 12. Following, the distance between each neighboring point 13 located in the searching range S of the initial core point 12 and each of the border clustering symbols 14a, 14b, 14c and 14d is respectively calculated. The neighboring points 13 closest to the border clustering symbols 14a, 14b, 14c and 14d are determined and defined as clustering neighboring points 141a, 141b, 141c and 141d.

Referring to FIGS. 1 and 4 through 6, the second determination step S4, based on the tolerance index α, determines whether the data point density of the searching range S of the initial core point 12 is the same as the data point density of the searching range S of each of clustering neighboring points 141a, 141b, 141c and 141d. If so, a plurality of first border symbols 15 is arranged on the border of the searching range S of the initial core point 12, and the neighboring points 13 closest to the plurality of first border symbols 15 are defined as extension neighboring points 151. The extension neighboring points 151 are further added to a created seed list and the neighboring points 13 located in the searching ranges S of the initial core point 12 and the extension neighboring points 151 are clustered together as a data cluster. If the data point density of the searching range S of the initial core point 12 is not the same as the data point density of the searching range S of the clustering neighboring points 141a, 141b, 141c and 141d, the first retrieving step S2 is re-performed. In this manner, it is ensured that the clusters having the same data point density will be categorized as the same data cluster, enabling the data points 11 of the data set 1 to be clustered based on the local data point density thereof. Specifically, the invention determines whether a plurality of clusters has the same data point density based on the following formula:

$$m_0 < m_i \leq (1+\alpha)m_0 \quad (1),$$

$$m_i < m_0 \leq (1+\alpha)m_i \quad (2).$$

Wherein, $m_0$ is the number of the neighboring points 13 located in a searching range S of a data point 11, $m_i$ is the number of the neighboring points 13 located in a searching range S of another data point 11, and $\alpha$ is the tolerance index.

Please referring to FIG. 4 again, take the embodiment as an example, $m_0$ in the formula (1) and (2) represents the number of the neighboring points 13 located in the searching range S of the initial core point 12, whereas $m_i$ represents the number of the neighboring points 13 located in the searching range S of a respective clustering neighboring point 141. Take the clustering neighboring point 141a as an example, the distance between the clustering neighboring point 141a and each data point 11 of the data set 1 is calculated. If the distance between the clustering neighboring point 141a and a certain data point 11 is smaller than the value of the defined scanning radius R, the certain data point 11 is determined to be a neighboring point 13 located in a searching range S of the clustering neighboring point 141a. Based on this, the neighboring points 13 located in the searching range S of the clustering neighboring point 141a are accordingly determined. If the initial core point 12 and the clustering neighboring point 141a satisfy one of the formula (1) and (2), the initial core point 12 and the clustering neighboring point 141a are determined to have the same data point density. Similarly, the clustering neighboring points 141b, 141c and 141d are compared with the initial core point 12 in the same manner. If any one of the clustering neighboring points 141a, 141b, 141c and 141d is determined to not satisfy one of the formulas (1) and (2), the first retrieving step S2 is re-performed.

Please refer to FIG. 5 again, specifically, if all clustering neighboring points 141a, 141b, 141c and 141d are determined to have the same data point density of the initial core point 12, 8 first border symbols 15a, 15b, 15c, 15d, 15e, 15f, 15g and 15h are evenly arranged on the border of the searching range S of the initial core point 12. Next, the distance between each of the first border symbols 15a, 15b, 15c, 15d, 15e, 15f, 15g and 15h and each of the neighboring points 13 of the searching range S of the initial core point 12 is calculated. Based on the calculation, the neighboring points 13 closest to the first border symbols 15a, 15b, 15c, 15d, 15e, 15f, 15g and 15h are determined and defined as extension neighboring points 151a, 151b, 151c, 151d, 151e, 151f, 151g and 151h and added to the seed list as seed data points. Note that if two or more first border symbols 15 have a common extension neighboring point 151, the common extension neighboring point 151 is added to the seed list once. By using the mechanism, the invention is capable of maintaining high data clustering accuracy for areas with the same data point density by selecting only the neighboring points 13 closest to the first border symbols 15, while filtering other neighboring points 13.

Please refer to FIG. 6 again, take the extension neighboring point 151a as an example, the distance between the extension neighboring point 151a and each data point 11 of the data set 1 is calculated. If the distance between the extension neighboring point 151a and a certain data point 11 is smaller than the value of the scanning radius R, the certain data point 11 is determined to be a neighboring point 13 of the extension neighboring point 151a. Based on this, the neighboring points 13 of the extension neighboring points 151b, 151c, 151d, 151e, 151f, 151g and 151h are accordingly determined. Finally, all data points 11 located in the searching ranges S of the initial core point 12 and the extension neighboring points 151 are clustered together as a data cluster.

Please refer to FIGS. 4 through 6 again, specifically, if it is determined in the second determination step S4 that the data point density of the searching range S of the initial core point 12 is the same as that of the searching ranges S of the clustering neighboring points 141, a plurality of extension neighboring points 151 is determined, and all neighboring points 13 located in the searching ranges S of the initial core point 12 and the extension neighboring points 151 are clustered together as a data cluster. Since the searching ranges S of the 4 clustering neighboring points 141 are widely overlapped with the searching ranges S of the 8 extension neighboring points 151, the searching ranges S of the 8 extension neighboring points 151 are assumed to have the same data point density as the searching range S of the initial core point 12 if the searching ranges of the 4 clustering neighboring points 141 have the same data point density as the searching range S of the initial core point 12. Based on this, by determining the data point density of only the 4 clustering neighboring points 141, the data point density of the 8 extension neighboring points 151 may be determined. In contrast to the traditional method that accordingly compares the data point density of the searching range S of the initial core point 12 with that of the searching range S of each neighboring point 13 of the initial core point 12, the proposed method significantly reduces the time consumption.

Figure 7:
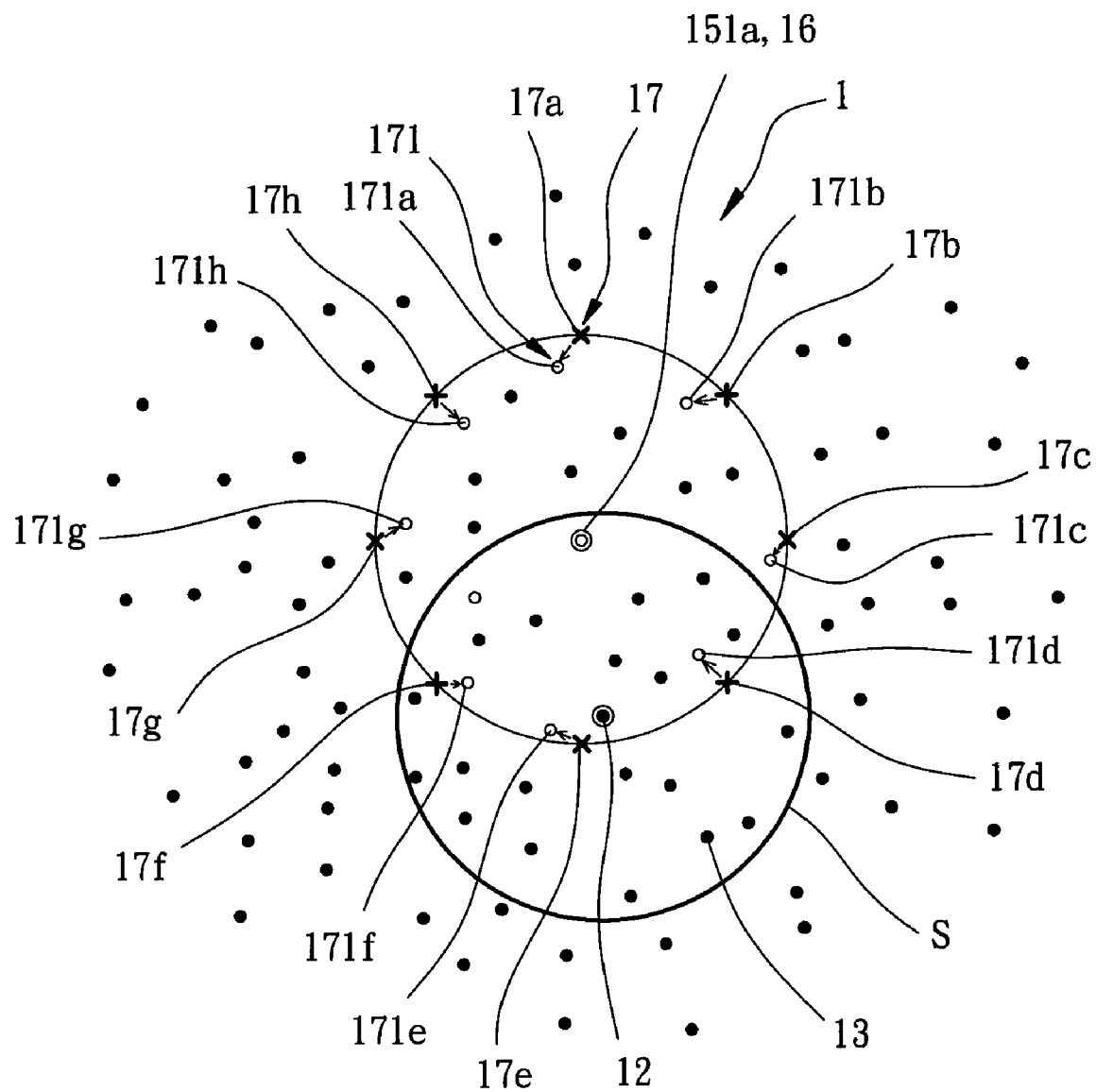
FIG. 7 is a flowchart illustrating a second retrieving step according to a preferable embodiment of the invention.

Please refer to FIGS. 1 and 7, the second retrieving step S5 of the invention retrieves one seed data point from the seed list as a seed core point 16, arranges a plurality of second border symbols 17 on the border of the searching range S of the seed core point 16, and defines the neighboring points 13 closest to the plurality of second border symbols 17 as seed neighboring points 171. Specifically, in the embodiment, the invention evenly arranges 8 second border symbols 17a, 17b, 17c, 17d, 17e, 17f, 17g and 17h on the border of the searching range S of the seed core point 16. Next, the distance between each of the second border symbols 17a, 17b, 17c, 17d, 17e, 17f, 17g and 17h and each neighboring point 13 of the searching range S of the seed core point 16 is calculated. Based on the calculation, the neighboring points 13 closest to the second border symbols 17a, 17b, 17c, 17d, 17e, 17f, 17g and 17h are accordingly determined and defined as seed neighboring points 171a, 171b, 171c, 171d, 171e, 171f, 171g and 171h.

Figure 8:
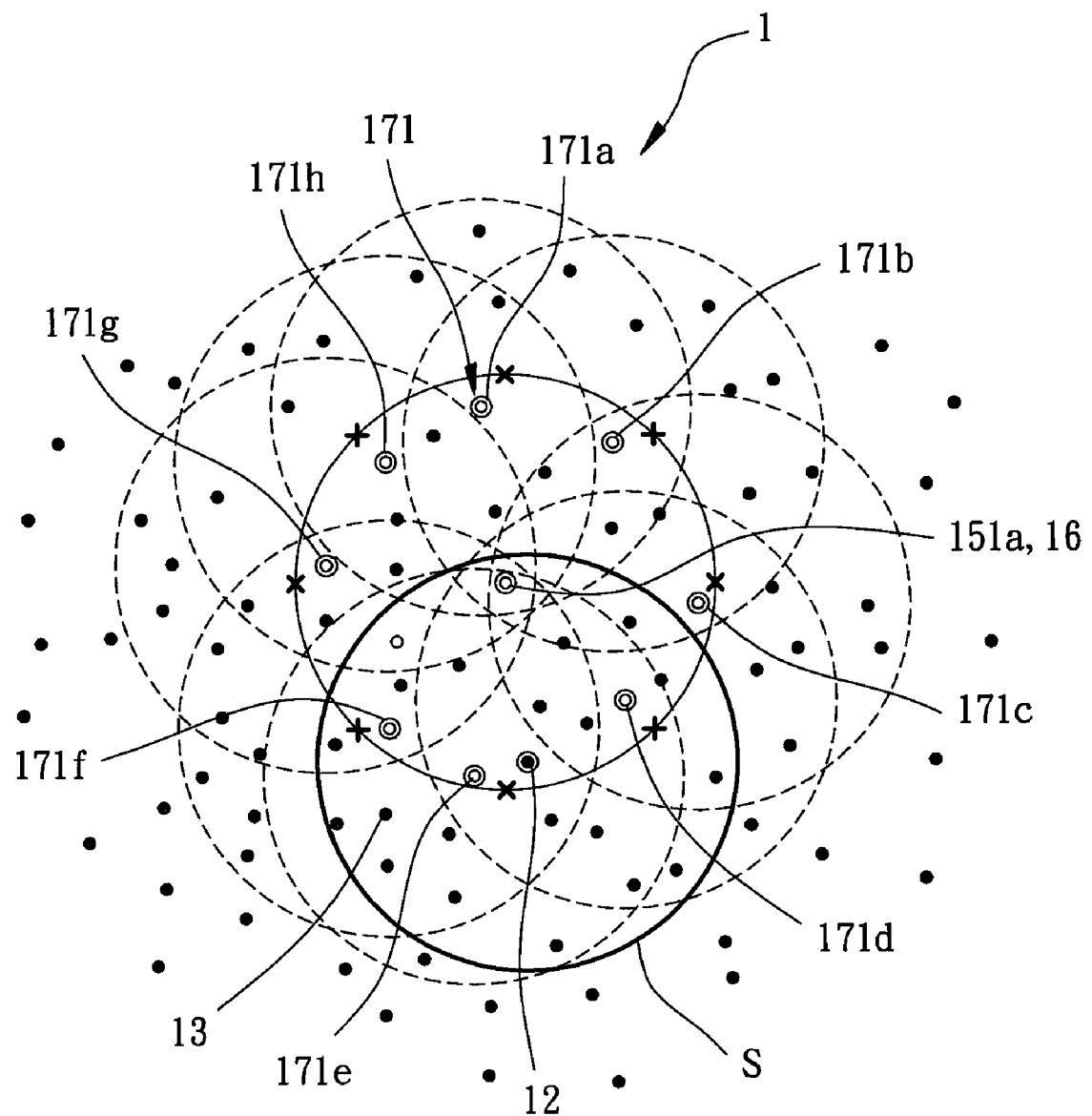
FIG. 8 is a flowchart illustrating a third determination step according to a preferable embodiment of the invention.
Figure 9:
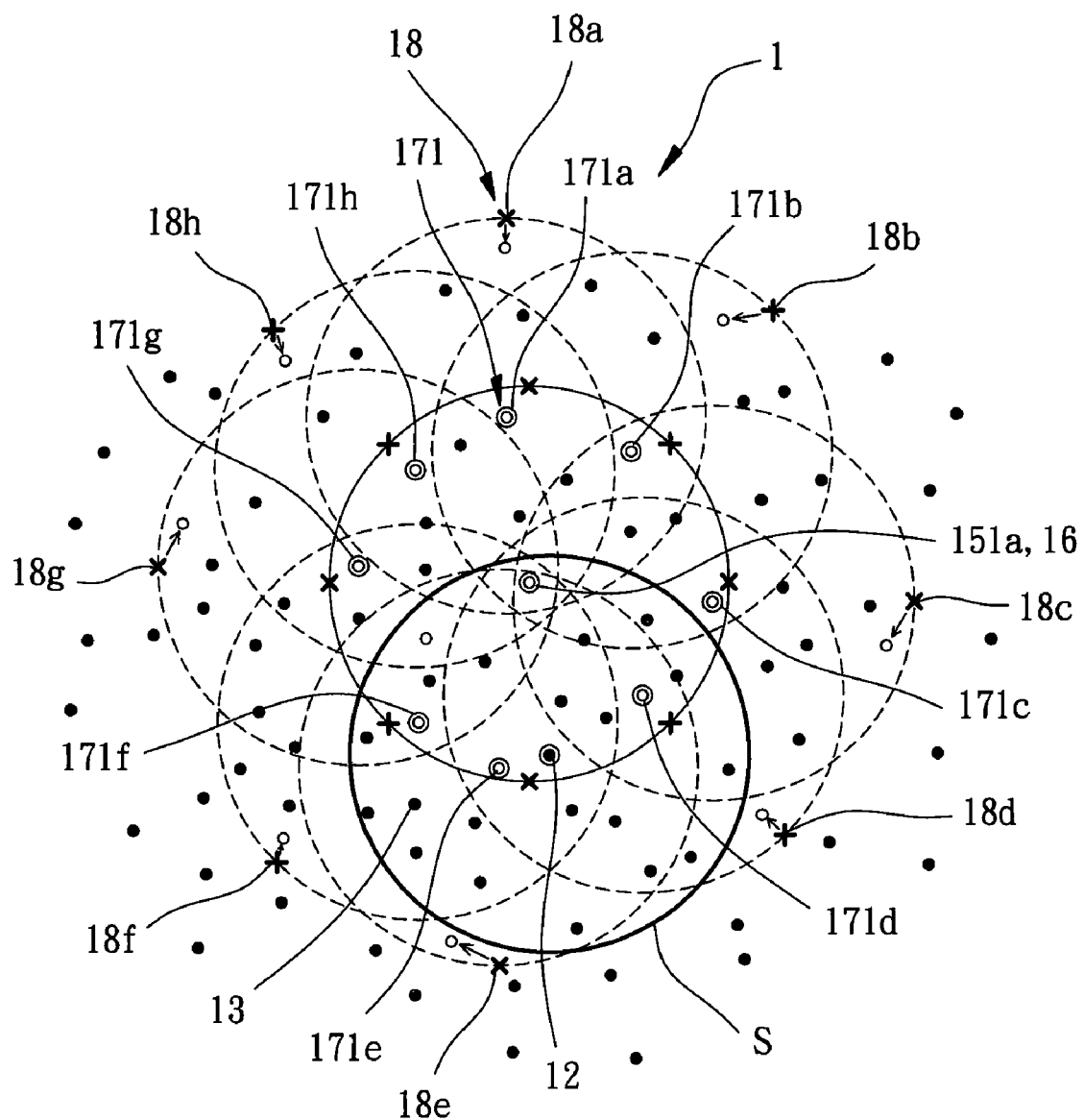
FIG. 9 is another flowchart illustrating a third determination step according to a preferable embodiment of the invention.

Please refer to FIGS. 1, 8 and 9, the third determination step S6 of the invention, based on the tolerance index a, determines whether the searching ranges S of all seed neighboring points 171 have the same data point density. If so, all neighboring points 13 located in searching ranges S of the seed neighboring points 171 and the seed core point 16 are clustered together as a data cluster. Next, a plurality of third border symbols 18 is arranged on locations on the borders of the searching ranges S of the seed neighboring points 171 that are furthest to the seed core point 16. Next, the neighboring points 13 located in the searching ranges S of the seed neighboring points 171 that are closest to the third border symbol 18 are added to the seed list as seed data points. Based one this, 8 neighboring points 13 are accordingly determined and added to the seed list as seed data points. Next, the second retrieving step S5 is re-performed. In the third determination step S6, if the determination is negative, the first termination determination step S7 is performed. In particular, every two opposing seed neighboring points 171 are grouped and compared to determine whether the two seed neighboring points 171 have the same data point density within their searching ranges S, wherein the determination is based on the formulas (1) and (2).

Specifically, referring to FIG. 8 again, the seed neighboring point 171a is grouped and compared with the seed neighboring point 171e, wherein in the third determination step S6, $m_0$ is the number of the neighboring points 13 located in the searching range S of the seed neighboring point 171a, and $m_i$ is the number of the neighboring points 13 located in the searching range S of the seed neighboring point 171e. If the seed neighboring points 171a and 171e satisfy one of the formulas (1) and (2), the seed neighboring points 171a and 171e are deemed to have the same data point density. Similarly, the seed neighboring point 171b is grouped and compared with the seed neighboring point 171f, the seed neighboring point 171c is grouped and compared with the seed neighboring point 171g, and the seed neighboring point 171d is grouped and compared with the seed neighboring point 171h. That is, in the third determination step S6, every two opposing seed neighboring points 171 are grouped and the determination of the third determination step S6 is positive only when the two seed neighboring points 171 within every group are compared to have the same data point density within their own searching ranges S. If the two seed neighboring points 171 within any group are compared to have different data point density, the determination of the third determination step S6 is negative.

Referring to FIG. 8 again, since the seed neighboring point 171e is very close to the initial core point 12, the searching range S of the seed neighboring point 171e is widely overlapped with that of the initial core point 12. Therefore, the searching range S of the seed neighboring point 171e substantially has the same data point density as that of the initial core point 12. Based on this, through the formulas (1) and (2), if the searching range S of the seed neighboring point 171a is determined to have the same data point density as that of the seed neighboring point 171e, the searching range S of the seed neighboring point 171a is assumed to have the same data point density as that of the initial core point 12. By comparing the data point density of the searching ranges S of two opposing seed neighboring points 171, the number of times of comparison can be reduced, thereby facilitating the data clustering speed for areas with the same data point density.

In addition, please referring to FIG. 9 again, based on the assumption that the searching ranges S of the seed neighboring points 171 and the seed core point 16 are deemed as the same cluster, a plurality of third border symbols 18 is arranged on locations on the borders of the searching ranges S of the seed neighboring points 171 that are farthest to the seed core point 16. Take the seed neighboring point 171a as an example, a third border symbol 18a is arranged on a location of the border of the searching range S of the seed neighboring point 171a that is farthest to the seed core point 16. Following, the distance between the third border symbol 18a and each neighboring point 13 located in the searching range S of the seed neighboring point 171a is calculated. The neighboring point 13 that is closest to the third border symbol 18a is added to the seed list as a seed data point. Similarly, the third border symbols 18b, 18c, 18d, 18e, 18f, 18g and 18h are accordingly arranged on the borders of the searching ranges S of the seed neighboring points 171b, 171c, 171d, 171e, 171f, 171g and 171h, and the neighboring points 13 closest to the third border symbols 18b, 18c, 18d, 18e, 18f, 18g and 18h are added to the seed list as seed data points. In this manner, only a neighboring point 13 within the searching range S of a respective seed neighboring point 171 is added to the seed list so that the number of neighboring points 13 is significantly reduced, thereby facilitating the data clustering speed for areas with the same data point density.

Please referring to FIGS. 1 and 2, the first termination determination step S7 of the invention determines whether all seed data points within the seed list have been operated by the second retrieving step S5. If so, a single data cluster has been formed. If not, the second retrieving step S5 is re-performed. Specifically, once a seed data point has been operated by the second retrieving step S5, the seed data point is removed from the seed list. Note that the seed list is constantly added with new seed data points due to the third determination step S6, so the seed data points within the seed list have constantly been added and removed until no seed data point exists in the seed list. At the moment, a single data cluster has been formed, and the second termination determination step S8 is performed.

Please referring to FIGS. 1 and 2, the second termination determination step S8 of the invention, according to a condition, determines whether the whole procedures are finished. Specifically, the second termination determination step S8 determines whether all data points 11 are clustered or regarded as noise data points. If so, the clustering of the data set 1 is finished. If not, the first retrieving step S2 is re-performed.

To verify the proposed data clustering method as being efficient for performing a data clustering operation over areas with different data point density, the data sets A through E are used for experiment and verification. Since the traditional DBSCAN and IDBSCAN methods are not capable of performing a data clustering for areas with different data point density, they are not discussed here. Thus, only the DD-DBSCAN method is used for comparison with the proposed method. Table 1 shows the number of data points, noise points and clusters for data sets A through E. Table 2 shows the data clustering parameters for data sets A through E. In the experiment, a Central Processing Unit (CPU) of Pentium D 3.4 G and a 2 GB memory are used, with Java being the programming language. The experiment is repeated by 30 times and the average value thereof is retrieved as a simulation result shown in Table 3.

TABLE 1

|  | Data Set A | Data Set B | Data Set C | Data Set D | Data Set E |
| --- | --- | --- | --- | --- | --- |
| Number of Data Points | 10000 | 10000 | 10000 | 23900 | 33900 |
| Number of Noise Points | 1500 | 1500 | 1500 | 400 | 400 |
| Number of Clusters | 4 | 4 | 14 | 2 | 3 |

TABLE 2

| Parameters of Experiments | | | | | |
| --- | --- | --- | --- | --- | --- |
|  | Data Set A | Data Set B | Data Set C | Data Set D | Data Set E |
| Scanning Radius | 8 | 9 | 8 | 9 | 9 |
| Minimum Threshold Value For Data Point | 6 | 6 | 5 | 6 | 8 |
| Tolerance Index α | 0.8 | 0.8 | 0.9 | 0.5 | 0.5 |

TABLE 3

Simulation Results

| Algorithm | Item | Data Set A | Data Set B | Data Set C | Data Set D | Data Set E |
|---|---|---|---|---|---|---|
| DD-DBSCAN | TC | 30.83 | 35.53 | 22.64 | 164.86 | 2461.11 |
| | CCR | 99.94% | 99.98% | 99.86% | 97.31% | 94.12% |
| | NFR | 93.33% | 90.20% | 92.19% | 94.25% | 94.25% |
| The Invention | TC | 18.48 | 18.70 | 18.77 | 34.50 | 171.69 |
| | CCR | 99.80% | 99.85% | 99.85% | 99.90% | 99.99% |
| | NFR | 94.07% | 90.73% | 93.64% | 94.75% | 97.50% |

TC (Second): Run Time
CCR (%): Clustering Correct Rate
NFR (%): Noise Filtering Rate Please referring to Table 3, by comparing the traditional DD-DBSCAN method with the proposed method, it is shown that the invention significantly reduces the time consumption while maintaining high correction rate and high noise filtering rate. Therefore, the invention is verified to be efficient for the data clustering over areas with different data point density.

Although the invention has been described in detail with reference to its presently preferable embodiment, it will be understood by one of ordinary skill in the art that various modifications can be made without departing from the spirit and the scope of the invention, as set forth in the appended claims.

What is claimed is:

1. A density-based data clustering method executed under a computer system connected to at least a database, comprising:

a parameter-setting step for setting parameters of a scanning radius, a minimum threshold value and a tolerance index;

a first retrieving step for retrieving one data point from a data set as an initial core point and for defining all data points located in a searching range of the initial core point as neighboring points, wherein the searching range is radially extended from the initial core point with a radius of the scanning radius;

a first determination step for determining whether a number of the data points located in the searching range of the initial core point exceeds the minimum threshold value, and re-performing the first retrieving step when the determination of the first determination step is positive, and arranging a plurality of border clustering symbols on the border of the searching range of the initial core point and defining the neighboring points closest to the plurality of border clustering symbols as clustering neighboring points when the determination of the first determination step is negative;

a second determination step for determining whether searching ranges of the clustering neighboring points have the same data point density as the searching range of the initial core point according to the tolerance index, and arranging a plurality of first border symbols on the border of the searching range of the initial core point, defining the neighboring points closest to the plurality of first border symbols as extension neighboring points, adding the extension neighboring points to a seed list as seed data points, and defining all data points located in searching ranges of the extension neighboring points and the initial core point as the same cluster when the determination of the second determination step is positive, and re-performing the first retrieving step when the determination of the second determination step is negative;

a second retrieving step for retrieving one seed data point from the seed list as a seed core point and for arranging a plurality of second border symbols on the border of a searching range of the seed core point and defining the neighboring points closest to the plurality of second border symbols as seed neighboring points;

a third determination step for determining whether all searching ranges of the seed neighboring points have the same data point density according to the tolerance index;

a first termination determination step for determining whether the clustering for a single data cluster is finished; and a second termination determination step for determining whether to terminate the density-based data clustering method according to a condition.

2. The density-based data clustering method as claimed in claim 1, wherein the second and third determination steps are performed according to the formulas:

$$m_0 < m_i \leq (1+\alpha)m_0,$$

$$m_i < m_0 \leq (1+\alpha)m_i,$$

wherein $m_i$ is the number of data points located in a searching range of a data point, $m_0$ is the number of data points located in a searching range of another data point, and $\alpha$ is the tolerance index.

3. The density-based data clustering method as claimed in claim 1, wherein the seed neighboring points are divided into a plurality of groups, each comprising two opposing seed neighboring points, and the third determination step further determines whether searching ranges of two seed neighboring points in each group have the same data point density, and, if the determination of the third determination step is positive, defining a plurality of third border symbols, with each being arranged on a location on the border of a searching range of a respective one of the seed neighboring points that is farthest to the seed core point, determining the neighboring points located within searching ranges of the seed neighboring points that are closest to the plurality of third border symbols, adding the determined neighboring points to the seed list as seed data points, and defining all of the data points located in the searching ranges of the seed neighboring points and the seed core point as the same cluster, and re-performing the second retrieving step, and, if the determination of the third determination step is negative, performing the first termination determination step.

4. The density-based data clustering method as claimed in claim 2, wherein the seed neighboring points are divided into a plurality of groups, each comprising two opposing seed neighboring points, and the third determination step further determines whether searching ranges of two seed neighboring points in each group have the same data point density, and, if the determination of the third determination step is positive, defining a plurality of third border symbols, with each being arranged on a location on the border of a searching range of a respective one of the seed neighboring points that is farthest to the seed core point, determining the neighboring points located within searching ranges of the seed neighboring points that are closest to the plurality of third border symbols, adding the determined neighboring points to the seed list as seed data points, and defining all of the data points located in the searching ranges of the seed neighboring points and the seed core point as the same cluster, and re-performing the second retrieving step, and, if the determination of the third determination step is negative, performing the first termination determination step.

5. The density-based data clustering method as claimed in claim 3, wherein the first termination determination step determines whether all of the seed data points within the seed list have been operated by the second retrieving step, and the method further comprising:

performing the second termination determination step when all of the seed data points within the seed list have been operated by the second retrieving step, and re-performing the second retrieving step when not all of the seed data points within the seed list have been operated by the second retrieving step.

6. The density-based data clustering method as claimed in claim 3, wherein the condition is to determine whether all of the data points have been clustered or defined as noise points, and the method further comprising:

terminating the density-based data clustering method when all of the data points have been clustered or defined as noise points, and re-performing the first retrieving step when not all of the data points have been clustered or regarded as noise points.

7. The density-based data clustering method as claimed in claim 3, further comprising defining the initial core point and the neighboring points as noise points when the determination of the first termination determination step is positive.

8. The density-based data clustering method as claimed in claim 3, wherein the tolerance index is between 0 and 1.

* * * * *